United States Patent [19]

Quinn

[11] 4,238,596
[45] Dec. 9, 1980

[54] PROCESS FOR OBTAINING COPOLYESTER-CARBONATES

[75] Inventor: Clayton B. Quinn, Mt. Vernon, Ind.

[73] Assignee: General Electric Company, Pittsfield, Mass.

[21] Appl. No.: 33,390

[22] Filed: Apr. 26, 1979

[51] Int. Cl.³ .............................................. C08G 63/64
[52] U.S. Cl. .................................... 528/179; 521/182; 521/189; 525/439; 525/461; 528/173; 528/176; 528/190; 528/191; 528/193; 528/194; 528/370; 528/371; 528/372
[58] Field of Search ............... 528/173, 176, 179, 190, 528/191, 193, 194, 370, 371, 372; 521/182, 189; 525/439, 461

[56] References Cited

U.S. PATENT DOCUMENTS

| | | | |
|---|---|---|---|
| 3,028,364 | 4/1962 | Conix | 528/173 |
| 3,030,331 | 4/1962 | Goldberg | 528/176 |
| 3,169,121 | 2/1965 | Goldberg | 528/193 |
| 3,697,481 | 10/1972 | Dialous et al. | 528/201 |
| 3,989,672 | 11/1976 | Vestergard | 528/196 |
| 4,156,069 | 5/1979 | Prevorsek et al. | 528/176 |

OTHER PUBLICATIONS

Prevorsek et al., *Synthesis of Poly(ester Carbonate) Copolymers*, Allied Chemical Corporation, Corporate Research Center, 4/79.

*Primary Examiner*—Lester L. Lee
*Attorney, Agent, or Firm*—Salvatore C. Mitri

[57] ABSTRACT

A process is disclosed for producing copolyester-carbonates by direct polymerization of a dihydric phenol and an acid dichloride at a single pH profile level.

16 Claims, No Drawings

PROCESS FOR OBTAINING COPOLYESTER-CARBONATES

This invention is directed toward a novel process for obtaining copolyester-carbonates by direct polymerization of diphenols and diacid chlorides.

BACKGROUND OF THE INVENTION

Various methods for the preparation of copolyester-carbonates are described in U.S. Pat. Nos. 3,030,331, 3,169,121, and, 3,207,814, all of which are hereby incorporated by reference. A process for obtaining aromatic polycarbonates wherein the pH is maintained between 8.0 and 10.2 is disclosed in U.S. Pat. No. 3,989,672 which is also incorporated herein by reference. In addition, copending application Ser. No. 755,352, assigned to the same assignee as this case, discloses a method for preparing polyester carbonates by an interfacial polymerization process wherein the copolymers obtained contain both carboxylate and carbonate groups. Copending application Ser. No. 844,285, also assigned to the same assignee as this case, discloses a method for preparing copolyester-carbonates from a mixed polyanhydride ester of a dicarboxylic acid and a halogen carbonic acid ester of a polyhydroxy compound, and copending application Ser. No. 33,393, filed Apr. 26, 1979 and assigned to the same assignee as this case discloses a process for obtaining copolyester-carbonates employing diacid chlorides and following a pH profile during the process.

While these prior art methods are useful, they are not completely satisfactory as they either involve complex chemical reactions and costly equipment, or require expensive starting materials, or are time consuming and, therefore, uneconomical to manufacture.

THE INVENTION

It has now been found that the shortcomings of prior art procedures employed to obtain copolyester-carbonates can be overcome or minimized by the process of this invention. In general, the process of the invention comprises directly polymerizing diphenols and diacid chlorides at a single pH level of about 10–12, preferably 10.5–11.5, to obtain copolyester-carbonates, the molar ratio of dihydric phenol to acid dichloride being in the range of about 90:10–55:45, preferably 70:30–60:40.

The dihydric phenols that can be employed in the practice of this invention are bisphenols such as bis(4-hydroxyphenol)methane, 2,2-bis(4-hydroxyphenyl)propane (bisphenol-A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenols such as p,p'-dihydroxydiphenol, 3,3'-dichloro-4,4-dihydroxydiphenyl, etc.; dihydroxyaryl sulfones such as bis(4-hydroxyphenyl)sulfone, bis(3,5-dimethyl-4-hydroxyphenyl)sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl)sulfoxide, bis(3,5-dibromo-4-hydroxyphenyl)sulfoxide, etc. A variety of additional dihydric phenols are also available such as are disclosed in U.S. Pat. Nos. 2,999,835, 3,028,365 and 3,153,008. Also suitable are copolymers prepared from the above dihydric phenols copolymerized with halogen-containing dihydric phenols such as 2,2-bis(3,5-dichloro-4-hydroxyphenyl)propane, 2,2-bis(3,5-dibromo-4-hydroxyphenyl)propane, etc. It is also possible to employ two or more different dihydric phenols or a copolymer of a dihydric phenol with a glycol or with hydroxy or acid terminated polyester, or with a dibasic acid as well as blends of any of the above materials.

The acid dichlorides that can be employed are the saturated, aliphatic dibasic acids which are derived from straight chain paraffin hydrocarbons, such as oxalic, malonic, dimethyl malonic, succinic, glutaric, adipic, pimelic, suberic, azelaic and sebacic acid and the halogen-substituted aliphatic dibasic acids. Aliphatic carboxylic acids containing hetero atoms in their aliphatic chain, such as thio-diglycollic or diglycollic acid can also be used as well as unsaturated acids such as maleic or fumaric.

Suitable examples of aromatic and aliphatic aromatic dicarboxylic acids which can be used are phthalic, isophthalic, terephthalic, homophthalic, o-, m-, and p-phenyl-enediacetic acid; the polynuclear aromatic acids such as diphenic acid, and 1,4-naphthalic acid. Preferred acid dichlorides are isophthaloyl dichloride ($IPCl_2$), and terephthaloyl dichloride ($TPCl_2$) as well as mixtures thereof.

As mentioned earlier, the copolyester-carbonates of this invention are prepared by employing a molecular weight regulator; i.e., a chain stopper or end capper, and typically an acid acceptor, a carbonate precursor, and a catalyst. The chain stoppers that can be employed include, but are not limited to, monohydric phenols such as phenol, chroman-I, paratertiarybutylphenol, parabromophenol, primary and secondary amines, etc. Preferably, phenol is employed as the chain stopper.

The acid acceptor can be either organic or inorganic. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The carbonate precursor employed can be either a carbonyl halide, a carbonate ester or a haloformate. The carbonyl halides which can be employed are carbonyl bromide, carbonyl chloride and mixtures thereof. Typical of the carbonate esters that can be employed are diphenyl carbonate, di-(halophenyl) carbonates such as di-(chlorophenyl) carbonate, di-(bromophenyl) carbonate, di-(tri-chlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The catalysts which can be employed can be any of the suitable catalysts that aid the polymerization of the bisphenol-A and the acid dichloride with phosgene. Suitable catalysts include tertiary amines such as triethylamine, triproplyamine, N,N,-dimethylaniline, quaternary ammonium compounds such as tetraethylammonium bromide, cetyl triethylammonium bromide, tetra-n-heptylammonium iodide, tetra-n-propylammonium bromide, tetramethylammonium chloride, tetramethylammonium hydroxide, tetra-n-butylammonium iodide, benzyl-trimethylammonium chloride and quaternary phosphonium compounds such as n-butyl-triphenyl phosphonium bromide and methyltriphenyl phosphonium bromide.

The solvent system employed is one in which the reactants can be accepted but which is inert with respect to the reactants. For example, an aqueous organic solvent system can be employed wherein the organic member can readily accept the reactants, but is inert to them. Exemplary of such organic members are methylene chloride, chlorobenzene, cyclohexanone, dimethylformamide, dimethylsulfoxide, carbon tetrachloride, and the like. Preferably, the organic portion of the solvent system is methylene chloride.

Also included herein are branched copolyester-carbonates wherein a polyfunctional aromatic compound is reacted with the dihydric phenol, the carbonate precursor and the acid dichloride to provide a thermoplastic randomly branched copolyester-carbonate.

These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Preferred polyfunctional aromatic compounds are trimellitic anhydride or trimellitic acid, or their haloformyl derivatives.

Also included herein are blends of a linear and a branched copolyester-carbonate.

By employing the process of the invention, copolyester-carbonates can be produced having improved heat distortion temperatures, improved tensile strength, and the like, which properties are similar to those of a high molecular weight aromatic polycarbonate.

The copolyester-carbonate composition produced by the process of the invention can be represented by the general formula

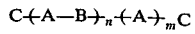

wherein the $-(A-B)-$ block represents the polyester moeity where B is bonded only to A and the $-(A)-$ block represents the polycarbonate moeity. Thus, in the foregoing general formula A can be a dihydric phenol, a phenolic copolymer and mixtures thereof; B is a member selected from the group consisting of diacid chlorides and mixtures thereof; C is a chain stopper; and, m and n are integers of about 1 to 2,000.

Details of the invention will become more apparent from a consideration of the following examples which are set forth to illustrate the best mode currently known to practice the invention. In the examples parts and percentages are by weight unless otherwise stated.

EXAMPLE 1

Preparation of Copolyester-Carbonate Having a Molar Ratio of Diacid Chloride: Dihydric Phenol of 30:70

To a ten gallon reactor vessel there was added 1596 g (7 moles) of bisphenol-A (BPA), 6 liters of methylene chloride, 5.5 liters of water, 28.2 g (3 mole %) of phenol as chain stopper, 14 ml of triethylamine, and 3.4 g of sodium gluconate. The pH of this mixture was adjusted to 10.5, and 609 g (3 moles) of isophthaloyl dichloride ($IPCl_2$) in 1 liter of methylene chloride was added over a 5 minute interval while controlling the pH between 10 and 11.5 with 35% aqueous caustic. Maintaining the pH at 11, 900 g of phosgene was delivered at a rate of 36 g/min. for 25 minutes. Again the pH was controlled at 11 using 35% aqueous caustic.

After phosgene addition was completed, the mixture was diluted with 5 liters of methylene chloride and the brine was separated from the methylene chloride—polymer phase. The methylene chloride solution was washed with 0.01 N HCl, and repeated washings with water. The copolyester-polycarbonate was recovered as a white powder from the methylene chloride by high pressure steam precipitation. The resulting resin was dried in a nitrogen purged fluid bed dryer to yield a resin with an intrinsic viscosity (I.V.) in methylene chloride at 25° C. of 0.48 dl/g.

EXAMPLE 2

The same procedure was followed as in Example 1 except that 1368 g (6 moles) BPA and 812 g (4 moles) isophthaloyl dichloride ($IPCl_2$) were employed. The molar ratio of diacid chloride ($IPCl_2$):dihydric phenol (BPA) in the copolyester-carbonate obtained was 40:60 and the copolyester-carbonate had an I.V. of 0.44 dl/g.

EXAMPLE 3

The same procedure was followed as in Example 1 except that 1938 g (8.5 moles) BPA, 304.5 g (1.5 moles) $IPCl_2$, and 93.8 g (3.5 mole %) chroman-I as chain stopper were employed to produce a copolyester-carbonate having an I.V. of 0.48 dl/g and in which the molar ratio of $IPCl_2$:BPA was 15:85.

EXAMPLE 4

The same procedure was followed as in Example 1 except that 2052 g (9 moles) BPA and 203 g (1 mole) of terephthaloyl dichloride ($TPCl_2$) in place of isophthaloyl dichloride ($IPCl_2$) were employed to produce a copolyester-carbonate having an I.V. of 0.58 dl/g and in which the molar ratio of $TPCl_2$:BPA was 10:90.

EXAMPLE 5

The same procedure was followed as in Example 1 except that 1710 g (7.5 moles) BPA and 507.5 g (2.5 moles) $TPCl_2$ were employed to produce a copolyester-carbonate having an I.V. of 0.60 dl/g and in which the molar ratio of $TPCl_2$:BPA was 25.75.

EXAMPLE 6

The same procedure was followed as in Example 1 except that 2052 g (9 moles) BPA, 203 g (1 mole) $TPCl_2$, and 80.4 g (3 mole %) chroman-I as chain stopper were employed to produce a copolyester-carbonate having an I.V. of 0.53 dl/g and in which the molar ratio of $TPCl_2$:BPA was 10:90.

Each of the powdered copolymer resins obtained in Examples 1-6 were then fed to an extruder operating at a temperature of about 500° F. to extrude each of the resins into strands and the extruded strands were chopped into pellets. The pellets were then injection molded at about 600° F. into test samples measuring about 3"×2"×⅛". Various physical properties of the test samples obtained from Examples 1-6 were determined according to the following test procedures:

Heat distortion temperature under load (DTUL) of the molded samples, with and without a commercial glass filler, was determined according to ASTM D-648. The molded samples containing glass filler were obtained in the same manner as described above except that a commercially obtained glass filler in an amount of 9% by weight of the copolymer resin was mixed with the copolymer resin powder by tumbling the ingredients together in a laboratory tumbler prior to extruding the mixture.

Yellowness Index (YI) was determined according to ASTM D-1925 on samples molded at 600° F.

Notched Izod (NI) and Unnotched Izod (UNI) impact on the ⅛" thick molded samples were determined according to ASTM D-256.

Flexural Yield (FY) and Flexural Modulus (FM) were determined according to ASTM D-790.

Tensile Yield (TY), Tensile Break (TB) and Tensile Elongation (TE) were determined according to ASTM D-638.

Melt Index (MI) was determined according to modified ASTM D-1238.

The results obtained are set forth in the following Table.

TABLE

Physical Properties of Copolyester-Carbonates at Different Diacid Chloride:Dihydric Phenol Mole Ratios

| Physical Properties | Sample of Example No. | | | | | |
|---|---|---|---|---|---|---|
| | 1 | 2 | 3 | 4 | 5 | 6 |
| | Mole Ratio IPCl$_2$/TPCl$_2$/BPA | | | | | |
| | 3/0/7 | 4/0/6 | 1.5/0/8.5 | 0/1/9 | 0/2.5/7.5 | 0/1/9 |
| TY ($\times 10^{-3}$) | 9.79 | 10.50 | 9.08 | — | — | — |
| TB ($\times 10^{-3}$) | 12.10 | 9.18 | 12.60 | — | — | — |
| TE (%) | 100.00 | 56.00 | 111.00 | — | — | — |
| FY ($\times 10^{-3}$) | 15.00 | 15.90 | 13.90 | — | — | — |
| FM ($\times 10^{-3}$) | 337.00 | 340.00 | 322.00 | — | — | — |
| DTUL (@ 264 psi, °F.) | 296.00 | 303.00 | 291.00 | 278.00 | 292.0 | 283.0 |
| DTUL (@ 66 psi, °F.) | 309.00 | 314.00 | 306.00 | 293.00 | 309.0 | 299.0 |
| DTUL (@ 264 psi, °F.) 9% Glass Reinforced* | 308.00 | 316.00 | 305.00 | 295.00 | 308.0 | 302.0 |
| NI (ft. lb./in.) | 6.00 | 5.20 | 14.70 | 15.20 | 9.5 | 14.6 |
| UNI (ft. lb./in.) | >40.00 | >40.00 | >40.00 | >40.00 | >40.0 | >40.0 |
| YI @ 600° F. Molding | 6.20 | 7.00 | 8.70 | 7.90 | 9.5 | 6.7 |
| MI | 4.40 | 3.59 | 4.66 | 3.01 | 1.3 | 2.5 |

*Owens Corning 415BB Chopped Stran Glass

The results shown in the above Table reveal that copolyester-carbonates obtained by the process of the invention exhibit improved heat distortion temperatures and tensile strength as well as good impact strength and thermal stability.

EXAMPLE 7

The same procedure was followed as in Example 1 except that 1368 g (6 moles) BPA, 731 g terephthaloyl dichloride (TPCl$_2$) and 81 g isophthaloyl dichloride (IPCl$_2$) (4 mole total of TPCl$_2$ and IPCl$_2$) were employed. The molar ratio of diacid chlorides (TPCl$_2$+IPCl$_2$):dihydric phenol (BPA) in the copolyester-carbonate obtained was 40:60 and the product had an I.V. of 0.53 dl/g. Molded samples obtained from this copolyester-carbonate composition as described above were found to have a DTUL at 264 psi of 326° F. and an ⅛" notched Izod of 6.2 ft. lbs./in. notch. These properties compare favorably with those shown for the polyester-carbonates shown in the Table.

What is claimed is:

1. A process for producing copolyester-carbonates comprising
   directly polymerizing in a solvent system at a pH level of about 10–12 a dihydric phenol, an acid dichloride and a chain stopper to form a reaction medium, the molar ratio of said dihydric phenol to said acid dichloride being in the range of about 90:10–55:45;
   adding a carbonate precursor to said reaction medium while maintaining the pH of said reaction medium at about 10–12;
   continuing the addition of said carbonate precursor until said reaction is complete; and
   directly recovering from said solvent system a copolyester-carbonate.

2. The process of claim 1 wherein said solvent system is an inert, aqueous system containing methylene chloride as its organic member.

3. The process of claim 1 wherein said dihydric phenol is bisphenol-A.

4. The process of claim 1 wherein said acid dichloride is a member selected from the group consisting of isophthaloyl dichloride, terephthaloyl dichloride, and mixtures thereof.

5. The process of claim 1 wherein said molar ratio is in the range of about 70:30–60:40.

6. The process of claim 1 wherein said chain stopper is phenol.

7. The process of claim 1 wherein said chain stopper is chroman-I.

8. The process of claim 1 wherein said carbonate precursor is phosgene.

9. The process of claim 1 wherein said pH level is maintained at about 10.5–11.5.

10. The process of claim 1 wherein the copolyester-carbonate obtained is represented by the general formula

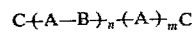

wherein A can be a dihydric phenol, a phenolic copolymer, and mixtures thereof; B is a member selected from the group consisting of diacid chlorides and mixtures thereof; C is a chain stopper; and, m and n are integers of about 1 to 2,000.

11. A process for producing copolyester-carbonates comprising directly polymerizing in an inert, aqueous solvent system containing methylene chloride as its organic member at a pH of about 10–12, a dihydric phenol, an acid dichloride and a chain stopper to form a reaction medium, said acid dichloride being a member selected from the group consisting of isophthaloyl dichloride, terephthaloyl dichloride, and mixtures thereof, the molar ratio of said dihydric phenol to said acid dichloride being in the range of about 90:10–55:45;

adding a carbonate precursor to said reaction medium while maintaining the pH thereof at about 10–12;

continuing the addition of said carbonate precursor until said reaction is complete; and, directly recovering from said solvent system a copolyester-carbonate.

12. The process of claim 11 wherein said dihydric phenol is bisphenol-A.

13. The process of claim 11 wherein said molar ratio is in the range of about 70:30–60:40.

14. The process of claim 11 wherein said chain stopper is phenol and said carbonate precursor is phosgene.

15. The process of claim 14 wherein said chain stopper is chroman-I.

16. The process of claim 11 wherein the copolyester-carbonate obtained is represented by the general formula

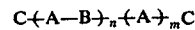

wherein A can be a dihydric phenol, a phenolic copolymer, and mixtures thereof; B is a member selected from the group consisting of diacid chlorides and mixtures thereof; C is a chain stopper; and, m and n are integers of about 1 to 2,000.

* * * * *